US010589340B2

United States Patent
Kohlstädt et al.

(10) Patent No.: US 10,589,340 B2
(45) Date of Patent: Mar. 17, 2020

(54) PUNCH RIVET SUPPLY DEVICE AND PUNCH RIVETING DEVICE

(71) Applicant: NEWFREY LLC, New Britain, CT (US)

(72) Inventors: Timo Kohlstädt, Giessen (DE); Stefan Lippert, Giessen (DE); Joachim Möser, Giessen (DE); Michael Meier, Giessen (DE)

(73) Assignee: NEWFREY LLC, New Britain, CT (US)

( * ) Notice: Subject to any disclaimer, the term of this patent is extended or adjusted under 35 U.S.C. 154(b) by 98 days.

(21) Appl. No.: 15/650,392

(22) Filed: Jul. 14, 2017

(65) Prior Publication Data

US 2018/0015530 A1  Jan. 18, 2018

(30) Foreign Application Priority Data

Jul. 15, 2016  (DE) .......................... 10 2016 113 114

(51) Int. Cl.
*B21J 15/32* (2006.01)
*B21J 15/12* (2006.01)
(Continued)

(52) U.S. Cl.
CPC ............. *B21J 15/12* (2013.01); *B21J 15/025* (2013.01); *B21J 15/32* (2013.01); *B21J 15/46* (2013.01);
(Continued)

(58) Field of Classification Search
CPC . B21J 15/12; B21J 15/32; B21J 15/025; B21J 15/46; Y10T 29/49897;
(Continued)

(56) References Cited

FOREIGN PATENT DOCUMENTS

| CN | 102873440 B | 11/2014 |
| CN | 204700523 U | 1/2015 |

(Continued)

OTHER PUBLICATIONS

Chen CN 204700523 U English Translation and figures (Year: 2015).*

(Continued)

*Primary Examiner* — Jason L Vaughan
*Assistant Examiner* — Amanda Kreiling
(74) *Attorney, Agent, or Firm* — Michael P. Leary; Kofi A. Schulterbrandt

(57) ABSTRACT

A supply device for a joining element which has a shaft, extending along a joining element axis with a first diameter, and an adjacent head with a second diameter which is greater than the first diameter. The supply device comprising a base enclosing a first joining element channel, a second joining element channel and a third joining element channel, which are at least partially arranged in a common channel plane, and which each have a cross-section which is adapted to the shape of the joining element. And the first and the second joining element channels are orientated relative to each other at a switching angle which is in a range from 5° to 45°, while the first and the second joining element channels merge into the third joining element channel at a junction with a switching arrangement.

26 Claims, 3 Drawing Sheets

(51) Int. Cl.
  *B23P 19/00* (2006.01)
  *B21J 15/02* (2006.01)
  *B21J 15/46* (2006.01)
  *B23K 9/20* (2006.01)
  *F16B 19/06* (2006.01)
  *F16B 19/08* (2006.01)
(52) U.S. Cl.
  CPC ............ *B23K 9/206* (2013.01); *B23P 19/001* (2013.01); *B23P 19/002* (2013.01); *F16B 19/06* (2013.01); *F16B 19/086* (2013.01)
(58) Field of Classification Search
  CPC ............. Y10T 29/5116; Y10T 29/5118; Y10T 29/5377; Y10T 29/49943; Y10T 29/49956
  See application file for complete search history.

(56) References Cited

FOREIGN PATENT DOCUMENTS

EP        2026921 B        3/2014
WO    WO-2007132195 A1 *  11/2007

OTHER PUBLICATIONS

Chen et al. CN 102873440 B English Translation and figures (Year: 2013).*
European Search Report dated Mar. 23, 2018.

* cited by examiner

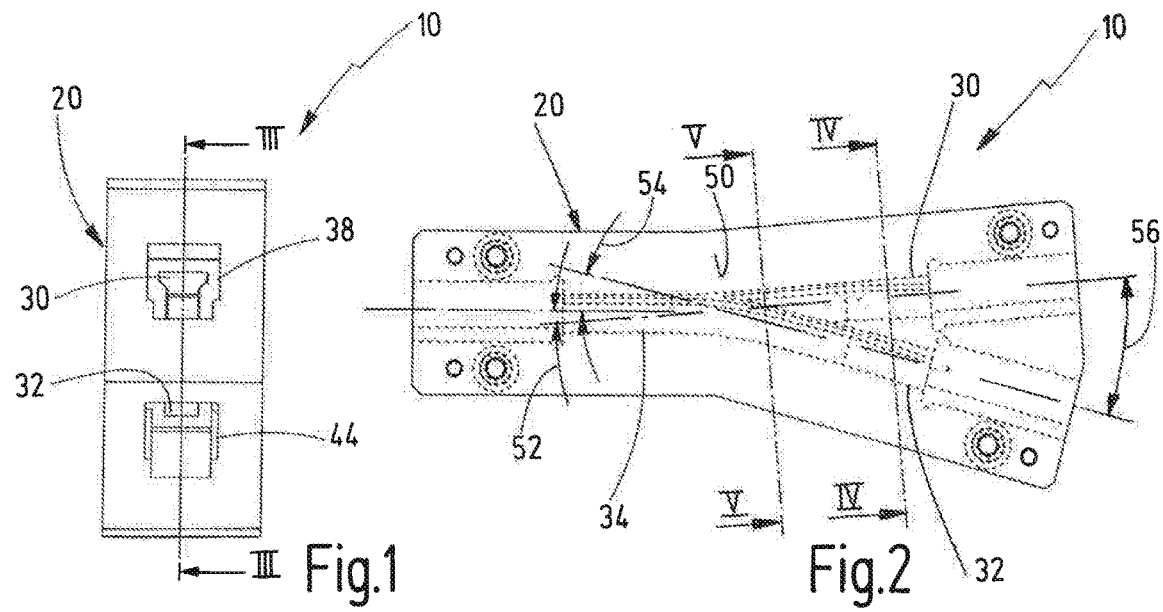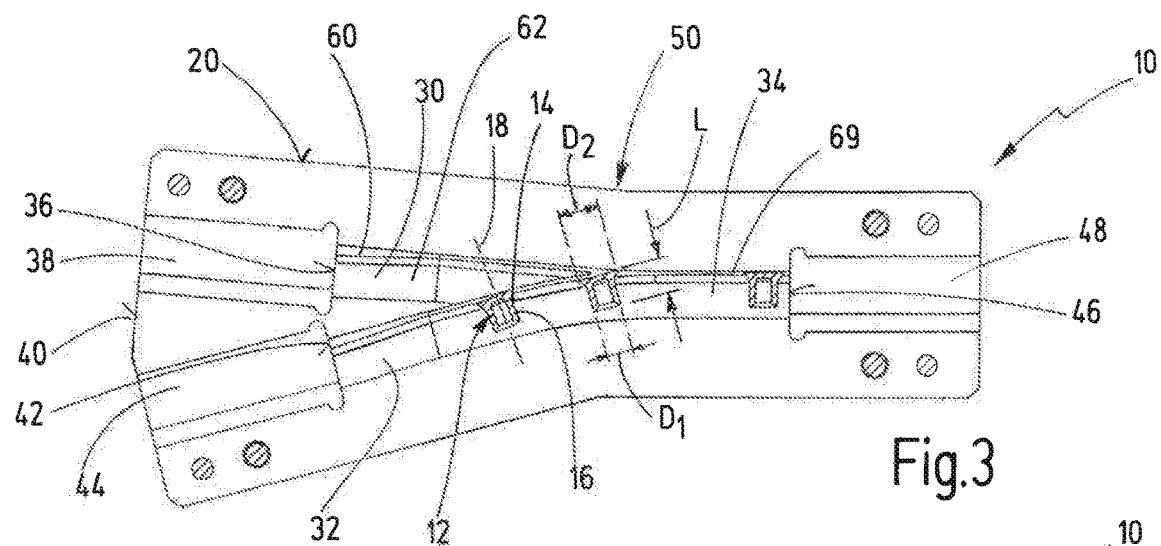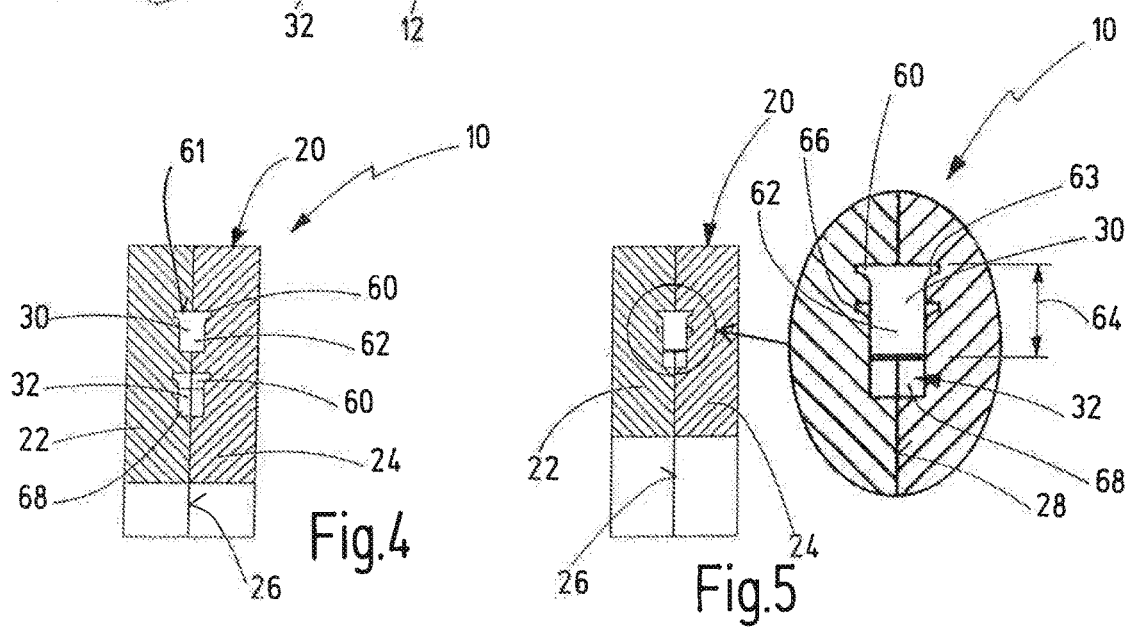

PUNCH RIVET SUPPLY DEVICE AND PUNCH RIVETING DEVICE

CROSS-REFERENCE TO RELATED APPLICATION

This application claims priority from German Patent Application No. 102016113114.8, filed on Jul. 15, 2016, the disclosure of which is incorporated herein by reference.

BACKGROUND OF THE INVENTION

The present invention relates to a supply device for joining elements, in particular for punch rivets, which have a shaft which extends along a joining element axis and which has a first diameter and which have an adjacent head with a second diameter which is greater than the first diameter, having a base which has a first joining element channel, a second joining element channel and a third joining element channel which are arranged in a common channel plane, which each have a cross-section which is adapted to the shape of the joining elements and which each have an opening in the region of an outer side of the base.

The present invention further relates to a joining device for connecting joining elements on or in workpieces, in particular for punch riveting, having a joining head, and having a joining element supply arrangement by means of which separated joining elements can be supplied, wherein the joining element supply arrangement has at least one supply channel in which joining elements can be supplied.

In the field of joining devices, in particular in the field of punch riveting devices, it is known to automatically supply joining elements such as punch rivets. The supply is carried out either directly to a joining head, in separated form. However, there may also be provided on the joining head a magazine which can be filled at a stationary filling device. In this instance, the automated supply is carried out at the stationary transfer location.

Furthermore, it is known to process joining elements of different shapes, for example, punch rivets of different lengths, using a joining device. The punch rivets are generally provided in a correctly sorted state in so-called separation devices. In order to enable the joining of different joining elements, different magazines may be provided on the joining head, a plurality of supply pipes to a joining head may also be provided, etcetera.

It should also be known to provide a distributor device with a sliding member in which an output channel can be brought into alignment with two or more input channels pneumatically by means of a carriage system.

Generally, such sliding devices require additional control elements and often have a complex construction.

In particular punch rivets in supply devices are intended to be supplied in such a manner that they maintain a predetermined orientation, wherein the channels contained in the supply device to this end have a cross-section which is adapted to the shape of the joining elements, for example, a head region and a shaft region. In this instance, the joining elements may be conveyed in such a manner that their joining axis or their shaft axis is orientated transversely relative to the supply direction.

In joining element supply arrangements with joining element channels which have a round cross-section and in which the joining elements are supplied with their longitudinal axis parallel with the supply direction, transitions between supply channels are comparatively simple to produce, as is known, for example, from documents CN 204 700 523 U or CN 102 873 440 B.

In joining element supply arrangements in which joining channels in contrast have a cross-section which is adapted to the shape of the joining elements, in particular in order to be able to transport the joining elements with their joining axis transverse relative to the supply direction, the distribution of supplied supply elements is generally intended to be carried out on the basis of sliding elements in which an output channel is pneumatically moved into position.

BRIEF SUMMARY OF THE INVENTION

Against this background, an object of the invention is to provide an improved supply device for joining elements and an improved joining device for connecting joining elements on or in workpieces.

The above object is achieved with the supply device mentioned in the introduction in that the first and the second joining element channels are orientated relative to each other at a switching angle which is in a range from 5° to 45°, in particular in a range from 10° to 35°, and particularly preferably in a range from 15° to 25°, wherein the first and the second joining element channels merge via a switching arrangement into the third joining element channel.

In the joining device mentioned in the introduction, the above object is achieved in that the joining element supply arrangement has a supply device according to the invention.

The supply device and the joining device which is provided therewith can be produced in a cost-effective manner. In many cases, the supply device may be produced with only two parts. Preferably, no additional control is required.

The supply device can preferably be freely expanded, in particular in a cascading manner, so that more than two joining element channels can ultimately be combined on a single joining element channel.

The supply device can be produced in a space-saving manner with very small dimensions, is preferably easy to clean and/or preferably has a simple structure.

In addition, the supply device may have a low maintenance complexity.

The third joining element channel is preferably orientated at a first redirection angle relative to the first joining element channel which is in a range from 0° to 15°. The third joining element channel is preferably orientated at a second redirection angle to the second joining element channel, wherein the second redirection angle is preferably in a range from 5° to 20°.

The second redirection angle is preferably greater than the first redirection angle.

The redirection angles are preferably smaller than the switching angle. A longitudinal axis of the joining element channel is preferably in the channel plane between the first and the second joining element channel.

The channel plane preferably extends inside the base. The cross-section of the joining element channels is preferably constructed in a polygonal manner and/or in such a manner that the joining axis of joining elements which are conveyed therein is orientated transversely relative to the supply direction.

The channel height of the individual joining element channels in the supply device may be identical. However, it is also possible for the channel heights of the first and the second joining channel to differ. A channel height of the third joining element channel is preferably at least as large as the greatest channel height of the first and second joining element channel.

The channel height is the extent of the joining element channel in the direction of the longitudinal axis of a joining element which is guided therein.

The channel heights are in this instance preferably selected in such a manner that all common joining element lengths can be supplied.

Of course, the openings of the joining element channels and the transitions into each other are preferably constructed in such a manner that no interference contours are produced at the intersections.

In the joining device according to the invention, a first supply channel is preferably connected to the first joining element channel and a second supply channel is preferably connected to the second joining element channel.

The problem is completely solved.

In the supply device according to the invention, it is advantageous for the switching arrangement to be a passive switching arrangement.

In this instance, the switching arrangement is in particular a one-way switch or a unidirectional switch. The supply direction through the supply device is in this instance generally from the first or the second joining element channel towards the third joining element channel.

In a passive switching arrangement, no additional control and no additional actuation member are preferably required.

In an active switching arrangement which can be adjusted in an active manner, the supply direction of the supply device may preferably also be reversed.

In this instance, for example, a sorting of incorrect components is possible. In this instance, the joining elements are supplied via the third joining element channel and, for example, directed as incorrect components towards the second joining element channel and as correct components towards the first joining element channel.

In the supply device according to the invention, it is further advantageous for the cross-sections of the three joining element channels to be constructed in such a manner that the joining element axes of the joining elements which are conveyed therein are orientated parallel with the channel plane.

In this instance, the joining elements are conveyed in a quasi "horizontal" manner.

In this instance, it is particularly advantageous for the cross-sections of the three joining element channels to each have a head region and a shaft region, wherein the head regions of the first and the second joining element channel merge in a continuous manner into the head region of the third joining element channel.

In this instance, the joining elements are each guided by means of the head regions through the entire supply device. The head regions of the joining element channels are in this instance also continued via the transition region between the three channels in such a manner that the joining elements can also be guided by means of their heads in the transition region.

It is consequently possible for the joining elements also to be moved in an orientated manner in this transition region, without rotating.

In this case, the channel height is preferably selected in such a manner that excessive tilting of the joining elements in the joining element channels is not possible.

In the above embodiment, it is advantageous for the base or the supply device not to have any movable element so that a particularly simple structure is produced.

According to another preferred embodiment, the cross-sections of the three joining element channels are each constructed in such a manner that the joining element axes of the joining elements which are conveyed therein are orientated transversely relative to the channel plane.

In this embodiment, the joining elements are supplied in a quasi "vertical" manner.

Of course, the joining element channels in this case may also each have a head region and a shaft region.

On the whole, it is advantageous for a switching element which is supported on the base so as to be able to be moved between a first position and a second position to connect either the first or the second joining element channel to the third joining element channel.

The switching element may in this instance preferably be constructed as a type of guiding element which in a transition region between the channels in one position forms a portion of a head region of a joining element channel cross-section and in the other position forms a portion of a shaft region of a joining element channel cross-section.

It is advantageous in this instance for a catch device to be associated with the switching element in order to secure the switching element in a locking manner in the first and/or in the second position.

It is thereby possible to prevent occurrences of wobbling of the switching element, in particular when the supply of joining element channels is carried out by means of supply air or blowing air.

The catch device is preferably constructed inside the base and/or sized in such a manner that the positions which are configured in a locking manner can be released in a passive manner, that is to say, for example, by means of supply air.

It is particularly preferable for the catch device to be configured in such a manner that the locking securing in one of the positions can be overcome in order to change the position of the switching element when supply air is supplied by the joining element channel.

In this instance, the switching element is preferably switched by the supply air into the other position in each case, before the joining element which is supplied by means of the supply air or blowing air reaches the switching element.

The catch device may in particular be produced by means of ball catches.

It is further on the whole advantageous for the switching element to be constructed as a pivoting member and to be able to be pivoted about a switching axis which is orientated transversely relative to the channel plane.

The pivoting member is preferably constructed in such a manner that it tapers in a pointed manner, in the direction towards the third joining element channel.

The switching axis is preferably arranged in a region between the first and the second joining element channel.

According to an alternative embodiment, the switching element is constructed as a sliding member and can be displaced parallel with the channel plane.

In this instance, it is preferable for there to be constructed in the sliding member a fourth joining element channel and a fifth joining element channel which are arranged in the channel plane beside each other, in particular separately from each other, wherein in a first position of the sliding member the fourth joining element channel connects the first joining element channel and the third joining element channel to each other and/or wherein in a second position of the sliding member the fifth joining element channel connects the second joining element channel and the third joining element channel to each other.

As mentioned above, it is preferable for the switching element to be able to be moved in a passive manner between the first and the second position, in particular by means of energy of the supply air used and/or by means of kinetic energy of the supplied joining elements.

It is further preferable in an alternative embodiment for there to be associated with the switching element an actuation member by means of which the switching element can be moved into the first and/or into the second position.

The actuation member may be an actuator, in particular a pneumatic actuator. The actuation member may in this instance be able to be actuated independently of the production of supply air by means of a control device. Alternatively, it is possible to carry out the actuation of the actuation member in accordance with the provision of supply air. If, for example, by means of the first joining element channel, a joining element is supplied by means of supply air, the actuation member brings the switching element into such a position in which the first supply element channel is connected to the third joining element channel. As long as a joining element is connected by means of the second joining element channel, the actuation member is controlled in this instance to move the switching element into the other position.

The actuator may in this instance at least use supply air as auxiliary energy.

On the whole, it is advantageous for the base to have a first base member and a second base member which are connected to each other by means of a connection plane, wherein the connection plane is orientated parallel with the channel plane.

In a first embodiment, in particular when the cross-sections of the joining element channels are constructed in such a manner that the joining axes of the joining elements which are conveyed therein are orientated parallel with the channel plane, it is preferable for each of the base portions to form a part-cross-section of the joining element channels, in particular half of the cross-section of the joining element channels in each case.

In the alternative embodiment, in which the joining element axes of joining elements are orientated transversely relative to the channel plane, it is preferable for the joining element channels to be constructed in one of the base portions, whereas the other base portion forms a cover for the joining element channels along the connection plane. It is consequently advantageous for the joining element channels to be constructed in the first base portion, wherein the second base portion forms a planar cover for the joining element channels. That is to say, the shape of the joining element channels is constructed completely in the first base portion, wherein the second base portion forms only a planar even termination of these joining element channels. This embodiment is in particular preferred when the cross-sections of the joining element channels are constructed in such a manner that the joining element axes of the joining elements which are conveyed therein are orientated transversely relative to the channel plane.

In the joining device according to the invention, it is preferable for the joining element supply arrangement to have a blown air generator which is associated with the at least one supply channel and which is activated when a joining element is intended to be supplied via the at least one supply channel.

As mentioned above, the blowing air or supply air can then be coupled to an actuation member in order to actuate a switching element of the supply device. In other cases, it is sufficient for the supply air to be supplied via the supply channel, wherein the air front reaches the switching element before the supplied joining element reaches the switching element so that the air front which strikes in front of the joining element can be used to move the switching element into the other position in each case and in this instance optionally to release a catch device.

Generally, an actuation member can be switched or controlled in order to actuate a switching element by means of a pneumatic drive. The control can be carried out by means of standard compressed air connections in a joining element supply arrangement.

All the range indications set out in this instance may alternatively be inclusive or exclusive of the range values.

Of course, the features mentioned above and those which will be explained below can be used not only in the combination given, but also in other combinations or alone without departing from the scope of the present invention.

BRIEF DESCRIPTION OF THE SEVERAL VIEWS OF THE DRAWINGS

Embodiments of the invention are illustrated in the drawings and will be explained in greater detail in the following description, in which:

FIG. 1 is a front view of an embodiment of a supply device according to the invention;

FIG. 2 is a plan view of the supply device of FIG. 1;

FIG. 3 is a sectional view along the line III-Ill of FIG. 1;

FIG. 4 is a sectional view along the line IV-IV of FIG. 2;

FIG. 5 is a sectional view along the line V-V of FIG. 2;

DETAILED DESCRIPTION OF THE PREFERRED EMBODIMENTS

Figure 6:
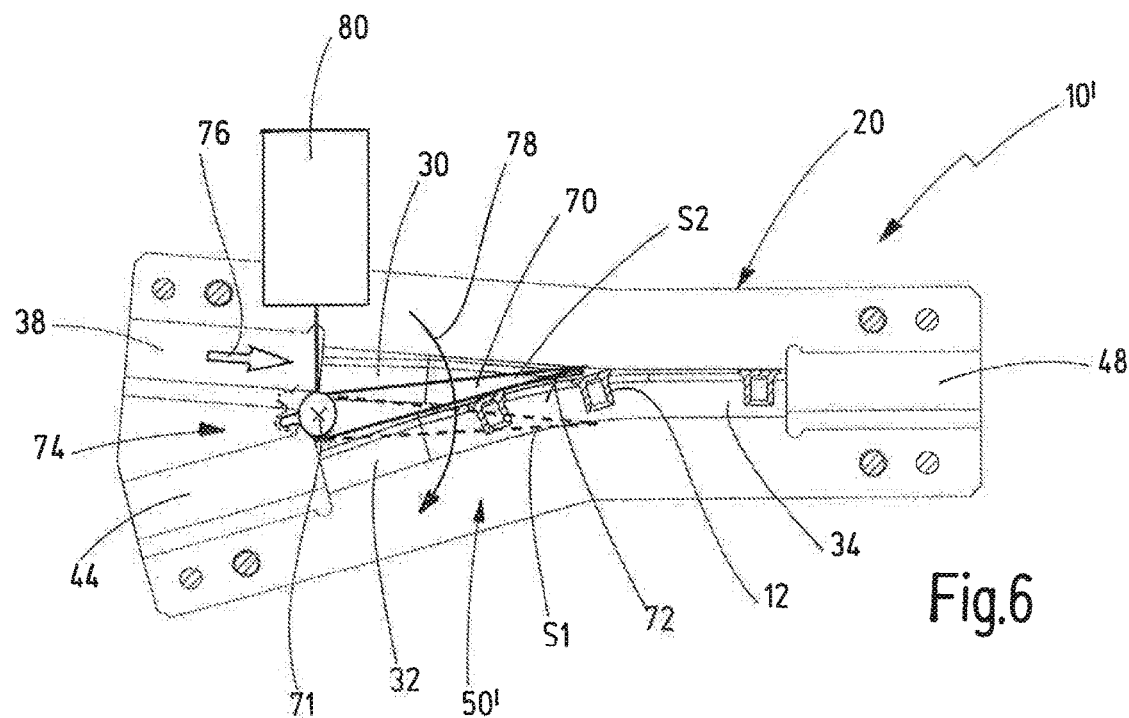
FIG. 6 is a view comparable with FIG. 3 of another embodiment of a supply device according to the invention.

FIGS. 1 to 5 show a supply device for joining elements which is generally designated 10.

The supply device 10 serves to supply joining elements 12 which have a head 14 and a shaft 16. The shaft 16 is orientated along a joining axis 18 and extends from the head 14 along the joining axis 18. The shaft 16 has an outer diameter $D_1$. The head 14 has an outer diameter $D_2$. The outer diameter $D_2$ of the head 14 is greater than the outer diameter $D_1$ of the shaft 16.

The supply device 10 has a base 20 which has a first base portion 22 and a second base portion 24, and which preferably comprises the two base portions.

The first base portion 22 and the second base portion 24 are connected to each other along a connection plane 26. The base 20 generally has an elongate form, wherein it is narrower at one axial end than at the other axial end.

The figures further show a channel plane 28 within which a plurality of joining element channels are arranged.

In particular, a first joining element channel 30, a second joining element channel 32 and a third joining element channel 34 are arranged in the channel plane 28.

The first joining element channel 30 has a first channel opening 36 which extends towards a first securing interface 38 which is arranged in the region of an outer side 40 of the base 20. A first supply channel may be connected to the first securing interface 38.

The second joining element channel 34 has a second channel opening 42 in the direction towards a second securing interface 44 to which a second supply channel can be connected. The two securing interfaces 38, 44 are located at a longitudinal end of the base.

The third joining element channel 34 has a third channel opening 46 which extends towards a third securing interface 48 which is arranged at the other longitudinal end of the base.

The first joining element channel 30 and the second joining element channel 32 are connected to the third joining element channel 34 by means of a switching arrangement 50 or merge therein via the switching arrangement 50.

The first joining element channel 30 and the third joining element channel 34 are orientated with respect to each other at a first redirection angle 52 which may be in a range from 0° to 15° inclusive in each case. The second joining element channel 32 and the third joining element channel 34 are orientated with respect to each other at a second redirection angle 54 which may be in a range from 5° to 20°.

The first joining element channel 30 and the second joining element channel 32 are orientated relative to each other at a switching angle 56 which is preferably in a range from 5° to 45°, in particular in a range from 15° to 25°.

The three joining element channels 30, 32, 34 are constructed inside the base 20 in such a manner that the joining elements 12 are conveyed therein in such a manner that the joining axis 18 thereof is located in the channel plane 28 in each case. The joining elements 12 are further guided in the joining element channels 30, 32, 34 in such a manner that the joining axis 18 is orientated transversely relative to the supply direction or the longitudinal extent of the channels. This is shown most clearly in FIG. 3.

The joining element channels are each in this instance provided with a cross-section which is adapted to the shape of the joining elements.

Thus, the first joining element channel 32 has a head region 60 for receiving a head 14 of a joining element 12, wherein the head region 60 is delimited transversely relative to the supply direction by a head region upper side 61. Furthermore, the cross-section of the first joining element channel 30 contains a shaft region 62 whose shape is adapted to the shape of the shaft 16 of the joining element 12 which is intended to be supplied.

The head region 60 merges via a transition contour 63 into the shaft region 62, as can be seen in particular in FIGS. 4 and 5.

The first joining element channel 30 further has a channel height 64 (FIG. 5) which is adapted to a maximum length L of joining elements 12 (see also FIG. 3) which are intended to be supplied via the first joining element channel 30.

The second joining element channel 32 and the third joining element channel 34 are adapted in a similar manner to the cross-section of joining elements. The channel height of the first and the second joining element channels 30, 32 may be different. The channel height of the third joining element channel 34 is greater than or equal to the largest channel height of the first and second joining element channel 30, 32.

More specifically, the second joining element channel 32 has a head region 66 and a shaft region 68. The third joining element channel 34 has a head region 69 and a shaft region which is not described in greater detail.

The head regions 60, 62 of the first and second joining element channel 30, 32 merge into the head region 69 of the third joining element channel 34.

There is therefore no movable element in the base 20. The joining elements are in each case guided in the joining element channels with sufficient protection against tilting.

In the region of the switching arrangement 50, the channels merge in particular continuously into each other.

The joining elements are in this instance in particular in the transition region or in the switching arrangement 50 guided by means of the head 14 thereof which is guided in the respective head region of the joining element channel.

The first base portion 22 and the second base portion 24 form in each case half of the channel geometry.

A supply of joining elements into the first or into the second joining element channel 30, 32 can be carried out by means of supply air or blowing air, but can also be carried out by means of gravitational force.

At the transitions from securing interfaces 38, 44, 48 to the respective joining element channels 30, 32, 34, no interference contours are produced. The channel heights permit a supply of all current joining element lengths.

The channel heights were in this instance selected in such a manner that excessively powerful tilting is not possible.

The switching arrangement 50 is constructed as a unidirectional passive switching arrangement in such a manner that joining elements are preferably supplied or conveyed exclusively from the first joining element channel 30 or the second joining element channel 32 in the direction towards the third joining element channel 34 and not vice versa.

In the following FIGS. 6 to 10, other embodiments of supply devices are shown. These generally correspond with respect to structure and operating method to the supply device 10 of FIGS. 1 to 5. Identical elements are therefore indicated with the same reference numerals. The differences are substantially explained below.

In the supply device 10' illustrated in FIG. 6, the switching arrangement 50' contains a switching element 70. The switching element 70 can be pivoted on the base 20 about a switching axis 71 between two positions S1 and S2, wherein the switching axis 71 extends perpendicularly to the channel plane (not illustrated in FIG. 6).

The switching axis 71 is arranged between the first and the second joining element channel 30, 32. The switching element 70 extends from the switching axis 71 in the direction towards the third joining element channel 34 and extends in particular at an acute angle in the direction towards the third joining element channel 34.

In the second position S2 shown in FIG. 6 with solid lines, the second joining element channel 32 and the third joining element channel 34 are connected to each other. The side of the switching element 70 facing the second joining element channel 32 is designated 72 in FIG. 6. This side 72 forms at least in the region of the switching arrangement 50' a head region upper side 72 of a head region 60 (not described in greater detail in FIG. 6) of the second joining element channel 32.

In the first position S1, which is illustrated in FIG. 6 with broken lines, the switching element 70 forms a lower side of a shaft region (not described in greater detail in FIG. 6) of the first joining element channel 30. In the first position S1, the first joining element channel 30 and the third joining element channel 34 are connected to each other.

The switching element 70 is in each case retained in a locking manner by means of a catch device 74 in the two positions S1, S2. However, the latching force is selected in such a manner that a movement of the switching element 70 from one position into the other can be carried out by means of compressed air alone.

FIG. 6 schematically shows that supply air or compressed air is supplied, for example, to the first joining element channel 30 whilst the switching element 70 is located in the position S2. When a joining element is supplied, there is produced such a compressed air impact 76 that it arrives at the switching element 70 before the joining element which is conveyed therewith arrives at the switching element 70. The compressed air impact 76 is in this instance so large that it releases the catch device 74 so that the switching element 70 moves from the position S2 into the position S1 and consequently opens the way for the joining element which is supplied by means of the compressed air impact 76 from the first joining element channel 30 to the third joining element channel 34. In the position S1, the switching element 70 is then again engaged by means of the catch device 74.

The associated pivot movement of the switching element 70 from the position S2 into the position S1 is schematically indicated in FIG. 6 at 78.

As an alternative to such a passive pivoting of the switching element 70, it is also possible to pivot the switching element 70 by means of an actuation member 80, between the first and the second position S1, S2. The actuation member 80 is preferably a pneumatic actuator.

Figures 7, 8:
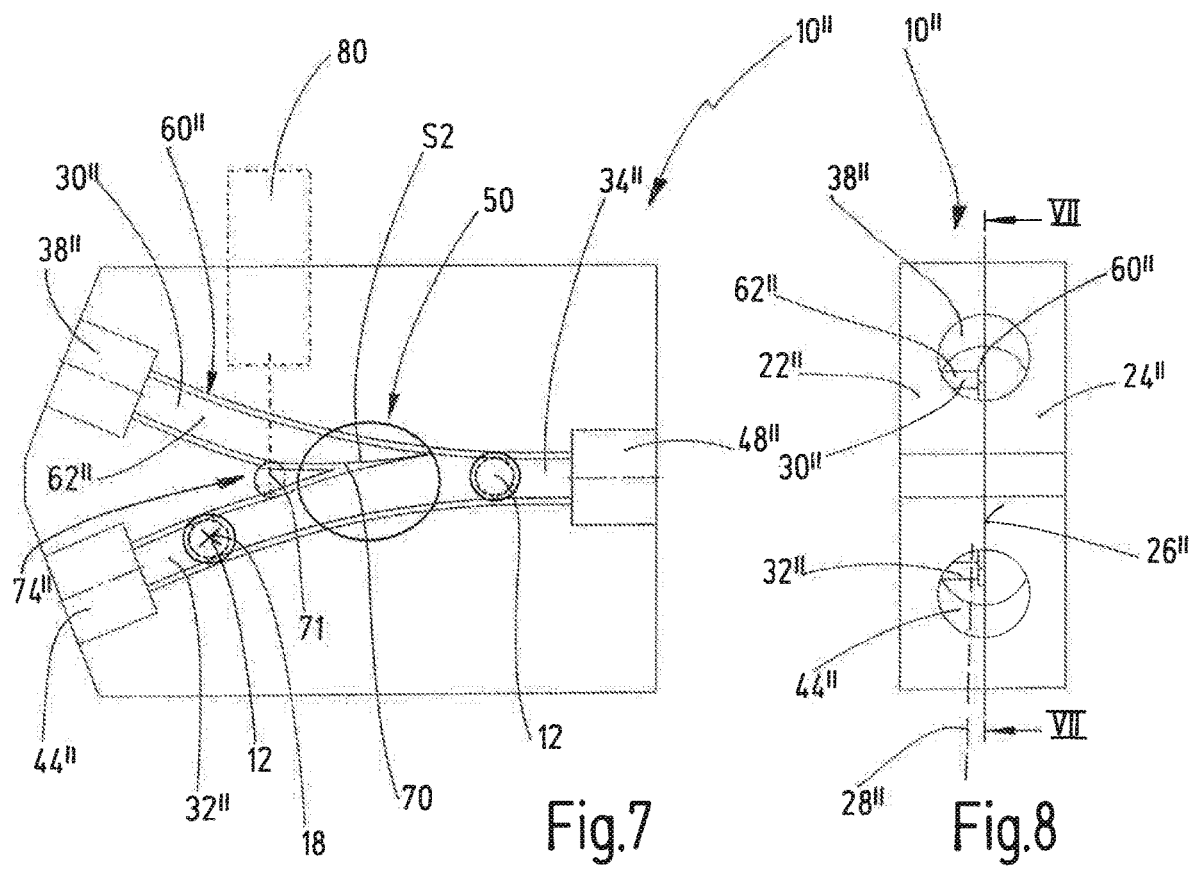
FIG. 7 is a view comparable with FIG. 6 of another embodiment of a supply device according to the invention.
FIG. 8 is a front view of the supply device of FIG. 7.

FIGS. 7 and 8 show another embodiment of a supply device 10" which generally corresponds with respect to structure and operating method to the supply device 10' of FIG. 6. Identical elements are therefore indicated with the same reference numerals. The differences are substantially explained below.

In the supply device 10", the joining element channels 30", 32", 34" are each constructed in such a manner that joining elements 12 which are conveyed therein are orientated in such a manner that the joining axis 18 thereof is orientated perpendicularly relative to the channel plane 28". Also in this instance, the joining axis 18 extends perpendicularly to the supply device or the longitudinal direction of the channels.

The switching element 70 forms in this instance in the switching arrangement 50 a support in the manner of the transition contour shown in FIG. 5 so that the head 14 of a joining element which is guided with the switching element 70 can be supported on the upper side of the switching element 70.

Figures 9, 10, 11:
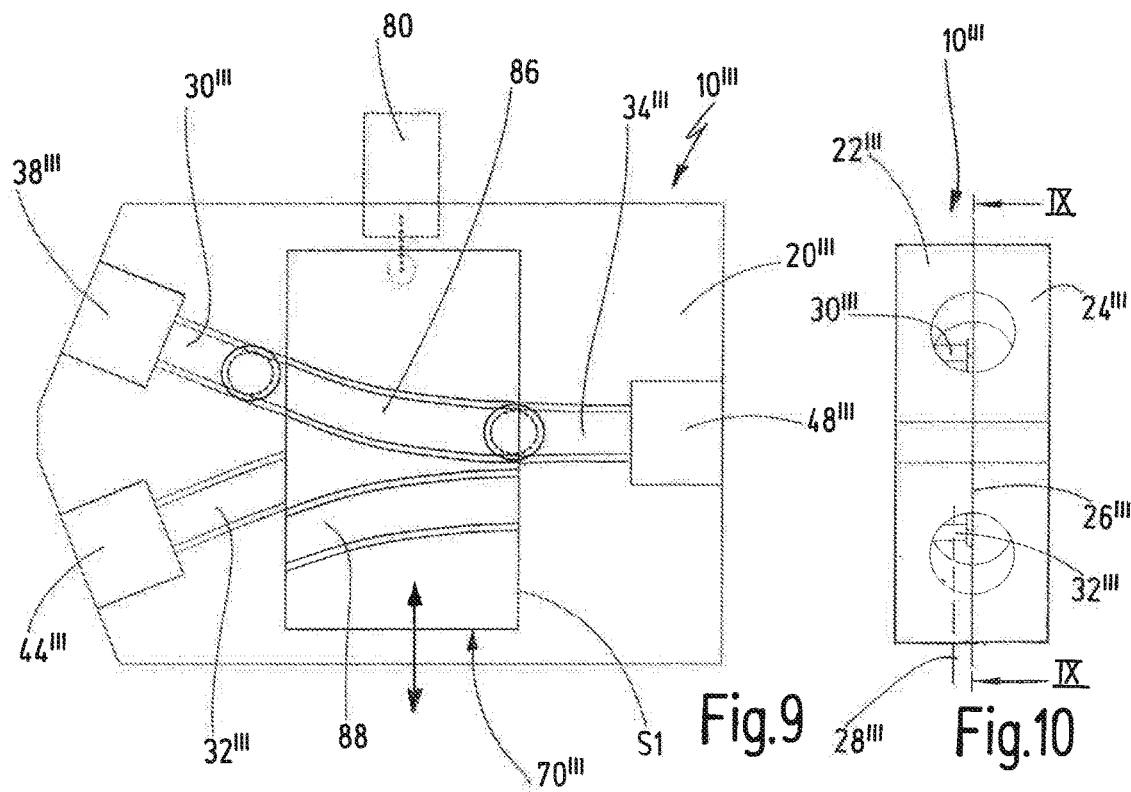
FIG. 9 is an illustration comparable with FIG. 6 of another embodiment of a supply device according to the invention
FIG. 10 is a front view of the supply device of FIG. 9.
FIG. 11 is a schematic illustration of a joining device and a joining element supply arrangement with an embodiment of a supply device according to the invention.

FIGS. 9 and 10 show another embodiment of a supply device 10''' which generally corresponds with respect to structure and operating method to the supply device 10" of FIGS. 7 and 8. Identical elements are therefore indicated with the same reference numerals. The differences are substantially explained below.

Whilst in the previously described embodiments of FIGS. 6 to 8 the switching element 70 is constructed in each case as a pivot element, which can be pivoted about a pivot or switching axis 71, in the supply device 10''' the switching element 70''' is constructed as a sliding member which is displaceably supported on the base 20" in a plane parallel with the channel plane 28".

In this case, on the sliding member 70''' there are constructed a fourth joining element channel 86 and a fifth joining element channel 88 which are constructed in the channel plane 28" beside each other and separated from each other.

In the first position S1 shown in FIG. 9, the fourth joining element channel 86 is orientated in this instance with the first joining element channel 30" and the third joining element channel 34" in such a manner that a joining element can be supplied from the first joining element channel 30" to the third joining element channel 34". However, a supply from the second joining element channel 32" is blocked.

If the sliding member 70''' is switched into the position S2 which is not shown in greater detail in FIG. 9, the fifth joining element channel 88 connects the second joining element channel 32" to the third joining element channel 34" in order to be able to supply joining elements via this connection.

FIG. 11 is a schematic view of a joining device 90. The joining device 90 has a joining head 92 which can be moved, for example, by means of a robot 94. The joining head 92 may have a C-frame at one end of which a workpiece arrangement 96 is supported by means of a die 98. At the other end of the C-frame, there may be provided a punch 100 by means of which joining elements can be driven into the workpiece arrangement 96 in order to connect workpieces of the workpiece arrangement 96 to each other, by means of a so-called punching rivet method. The punch rivets may in particular be so-called semi-hollow punch rivets but may also be solid punch rivets.

A joining element supply arrangement 102 is associated with the joining device 90. The joining element supply arrangement 102 has a first joining element separator 104 and a second joining element separator 106. The first joining element separator 104 is connected by means of a first supply channel 108 to the first joining element channel 30 of a supply device 10 according to the invention. The second joining element separator 106 is connected by means of a second supply channel 110 to the second joining element channel 34 of the supply device 10.

Furthermore, the third joining element channel 34 of the supply device 10 is connected to the joining head 92 by means of a third supply channel 112, for example, with a magazine which is provided on the joining head. Alternatively, the supply device 10 may also be secured to the joining head 92.

There is associated with the joining element separators 104, 106 a supply air or blown air generator 114 which is connected to the separators 104, 106 by means of a valve arrangement 116. The valve arrangement 116 can be controlled by means of a control arrangement 118 in such a manner that blowing air produced by the blown air generator 114 is supplied either to the first or the second joining element separator 104, 106 in order to convey in each case a joining element which is separated in these separators via the associated supply channel in the direction towards the supply device 10.

The control arrangement 118 may also be configured to control the punch 100 of the joining device 90 by means of an interface A.

FIG. 11 shows the supply device 10 with a switching element 70. This may be pivoted back and forth in a passive manner between two positions S1, S2 in the manner described above.

Alternatively, it is possible to connect the blowing air lines which lead from the valve arrangement 116 to the separators 104, 106 to an actuation member 80$_{IV}$ which switches the switching element 70 in accordance with the separators 104, 106 by means of which a joining element is supplied.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A supply device for a joining element, the joining element including a shaft, which extends along a joining element axis and which has a first diameter, and an adjacent head, with a second diameter which is greater than the first diameter; wherein the supply device comprises:
   a base which partially defines a first joining element channel, a second joining element channel and a third joining element channel which are at least partially arranged in a common channel plane and which each have a cross-section which is adapted to the shape of the joining elements and which each have an opening, and wherein the first and the second joining element channels are orientated relative to each other at a switching angle which is in a range from 5° to 45°, and wherein the first and the second joining element channels merge into the third joining element channel at a junction, and wherein the first, second, and third joining element channels are constructed as a polygon and each define a cross section including a head region and a shaft region with the shaft region perpendicular to the head region; and
   a switching arrangement located in the base at the junction.

2. A supply device according to claim 1, wherein the switching arrangement is a passive switching arrangement.

3. A supply device according to claim 1, wherein the cross-section of the first, second, and third joining element channels are each constructed in such a manner that the joining element axes of the joining element, when conveyed therein, are orientated parallel with the channel plane, such that the joining elements are conveyed in a horizontal posture.

4. A supply device according to claim 3, wherein the head regions of the first and the second joining element channels merge in a continuous manner into the head region of the third joining element channel.

5. A supply device according to claim 1, wherein the cross-sections of the first, second, and third joining element channels are each constructed in such a manner that the joining element axes of the joining elements, when conveyed therein, are orientated transversely relative to the channel plane with the joining element axis oriented transversely to a longitudinal direction of the channels.

6. A supply device according to claim 1, and wherein the switching arrangement includes a switching element supported in the base so as to be able to be moved between a first position, wherein the first joining element channel is connected to the third joining element channel, and a second position, wherein the second joining element channel is connected to the third joining element channel.

7. A supply device according to claim 6, wherein the switching arrangement further includes a catch device operable for temporarily holding the switching element one of the first and the second positions.

8. A supply device according to claim 6, wherein the switching element is a pivoting member and can be pivoted about a switching axis which is orientated transversely relative to the channel plane.

9. A supply device according to claim 6, wherein the switching element includes a sliding member displaceable parallel with the channel plane.

10. A supply device according to claim 9, wherein the sliding member partially defines a fourth joining element channel and a fifth joining element channel which are arranged in the channel plane beside each other, and wherein the first position of the switching element the fourth joining element channel connects the first joining element channel and the third joining element channel, and wherein the second position of the switching element the fifth joining element channel connects the second joining element channel and the third joining element channel.

11. A supply device according to claim 6, wherein the switching arrangement further includes an actuation member operable for moving the switching element between the first position and the second position.

12. A supply device according to claim 1, wherein the base includes a first base member and a second base member which are connected to each other at a connection plane, and wherein the connection plane is orientated parallel with the channel plane.

13. A supply device according to claim 12, wherein the first, second, and third joining element channels are constructed in the first base portion, and the second base portion forms a planar cover for the joining element channels.

14. A joining device for installing a joining element in a workpiece, the joining element including a shaft, which extends along a joining element axis and which has a first diameter, and an adjacent head, with a second diameter which is greater than the first diameter; and wherein the joining device comprises:
   a joining head operable for installing the joining element in the workpiece;
   a joining element supply arrangement operable for supplying the joining elements to the joining head, and the joining element supply arrangement includes a supply channel through which joining elements can be transported, and
   a supply device operable for connecting the joining head and the joining element supply arrangement; and wherein the supply device includes:
      a base which partially defines a first joining element channel, a second joining element channel and a third joining element channel which are at least partially arranged in a common channel plane and which each have a cross-section which is adapted to the shape of the joining, and wherein the first and the second joining element channels are orientated relative to each other at a switching angle which is in a range from 5° to 45° and wherein the first and the second joining element channels merge into the third joining element channel at a junction, and wherein the first, second, and third joining element channels are constructed as a polygon and each define a cross section including a head region and a shaft region with the shaft region is perpendicular to the head region; and
      a switching arrangement located in the base at the junction.

15. A joining device according to claim 14, wherein the joining element supply arrangement further includes a blown air generator connectable with the supply channel and operable for blowing a joining element towards the joining head via the supply channel.

16. A supply device for a joining element, the joining element including a shaft, which extends along a joining element axis and which has a first diameter, and an adjacent head, with a second diameter which is greater than the first diameter; wherein the supply device comprises:
   a base which partially defines a first joining element channel, a second joining element channel and a third joining element channel which are at least partially arranged in a common channel plane and which each have a cross-section which is adapted to the shape of the joining elements and which each have an opening, and wherein the first and the second joining element channels are orientated relative to each other at a switching angle which is in a range from 5° to 45°, and wherein the first and the second joining element channels merge into the third joining element channel at a junction; and a switching arrangement located in the base at the junction and including a switching element supported in the base and movable between a first position, wherein the first joining element channel is connected to the third joining element channel, and a second position, wherein the second joining element channel is connected to the third joining element channel, and further includes a catch device operable for temporarily holding the switching element in one of the first position or the second position.

17. A supply device according to claim 16, wherein the switching arrangement is a passive switching arrangement.

18. A supply device according to claim 16, wherein the cross-section of the first, second, and third joining element channels are each constructed in such a manner that the joining element axes of the joining element, when conveyed therein, are orientated parallel with the channel plane.

19. A supply device according to claim 18, wherein the cross-sections of the first, second, and third joining element channels each have a head region and a shaft region, and wherein the head regions of the first and the second joining element channels merge in a continuous manner into the head region of the third joining element channel.

20. A supply device according to claim 16, wherein the cross-sections of the first, second, and third joining element channels are each constructed in such a manner that the joining element axes of the joining elements, when conveyed therein, are orientated transversely relative to the channel plane.

21. A supply device according to claim 16, wherein the switching element is a pivoting member and can be pivoted about a switching axis which is orientated transversely relative to the channel plane.

22. A supply device according to claim 16, wherein the switching element includes a sliding member displaceable parallel with the channel plane.

23. A supply device according to claim 22, wherein the sliding member partially defines a fourth joining element channel and a fifth joining element channel which are arranged in the channel plane beside each other, and wherein the first position of the switching element the fourth joining element channel connects the first joining element channel and the third joining element channel, and wherein the second position of the switching element the fifth joining element channel connects the second joining element channel and the third joining element channel.

24. A supply device according to claim 16, wherein the switching arrangement further includes an actuation member operable for moving the switching element between the first position and the second position.

25. A supply device according to claim 16, wherein the base includes a first base member and a second base member which are connected to each other at a connection plane, and wherein the connection plane is orientated parallel with the channel plane.

26. A supply device according to claim 25, wherein the first, second, and third joining element channels are constructed in the first base portion, and the second base portion forms a planar cover for the joining element channels.

* * * * *